US012633529B2

(12) United States Patent
Zhang et al.

(10) Patent No.: US 12,633,529 B2
(45) Date of Patent: May 19, 2026

(54) NEGATIVE ELECTRODE MATERIAL, NEGATIVE ELECTRODE CONTAINING NEGATIVE ELECTRODE MATERIAL, AND NEGATIVE ELECTRODE MANUFACTURING METHOD

(71) Applicant: Ningde Amperex Technology Limited, Ningde (CN)

(72) Inventors: Chengbo Zhang, Ningde (CN); Yuhao Lu, Ningde (CN); Yuansen Xie, Ningde (CN)

(73) Assignee: Ningde Amperex Technology Limited, Ningde (CN)

( * ) Notice: Subject to any disclaimer, the term of this patent is extended or adjusted under 35 U.S.C. 154(b) by 692 days.

(21) Appl. No.: 17/700,891

(22) Filed: Mar. 22, 2022

(65) Prior Publication Data

US 2022/0216465 A1     Jul. 7, 2022

Related U.S. Application Data

(63) Continuation of application No. PCT/CN2020/072938, filed on Jan. 19, 2020.

(30) Foreign Application Priority Data

Oct. 29, 2019    (CN) .......................... 201911039028.5

(51) Int. Cl.
H01M 4/48 (2010.01)
H01M 4/133 (2010.01)
(Continued)

(52) U.S. Cl.
CPC ........... H01M 4/483 (2013.01); H01M 4/133 (2013.01); H01M 4/134 (2013.01); H01M 4/386 (2013.01);
(Continued)

(58) Field of Classification Search
CPC ...... H01M 4/133; H01M 4/134; H01M 4/386; H01M 4/5835; H01M 4/587; H01M 4/625; H01M 10/0525; H01M 2004/021
See application file for complete search history.

(56) References Cited

U.S. PATENT DOCUMENTS 11,338,699 B2 * 5/2022 Bae ...................... H01M 10/48
2014/0076729 A1 3/2014 Iriyama et al.
(Continued)

FOREIGN PATENT DOCUMENTS

CN 103053066 A 4/2013
CN 104953087 A 9/2015
(Continued)

OTHER PUBLICATIONS

CN 105283986 English Translation (Year: 2016).*
(Continued)

*Primary Examiner* — Jimmy Vo
(74) *Attorney, Agent, or Firm* — Maier & Maier, PLLC

(57) ABSTRACT

A negative electrode material includes a silicon-containing material. The silicon-containing material includes at least one of pure silicon, silicon carbon, a silicon alloy, or a silicon oxide. A ratio B/A of a maximum value B in differentials dQ/dV with respect to 0.4V-0.55V to a maximum value A in differentials dQ/dV with respect to 0.2V-0.35V is 1.0-3.0 when the negative electrode material is electrified in a delithiation direction in a case of charging and discharging a battery that includes the negative electrode material used as a working electrode, metallic lithium used as a counter electrode, and an electrolyte containing a lithium-ion conductive substance, and in a case of plotting a relationship curve between a differential dQ/dV and a working electrode potential V, where the differential is
(Continued)

obtained by differentiating a charge/discharge capacity Q with respect to the working electrode potential V.

12 Claims, 3 Drawing Sheets

(51) Int. Cl.

| | |
|---|---|
| *H01M 4/134* | (2010.01) |
| *H01M 4/38* | (2006.01) |
| *H01M 4/583* | (2010.01) |
| *H01M 4/587* | (2010.01) |
| *H01M 4/62* | (2006.01) |
| *H01M 10/0525* | (2010.01) |
| *H01M 4/02* | (2006.01) |

(52) U.S. Cl.
CPC ......... *H01M 4/5835* (2013.01); *H01M 4/587* (2013.01); *H01M 4/625* (2013.01); *H01M 10/0525* (2013.01); *H01M 2004/021* (2013.01); *H01M 2004/027* (2013.01)

(56) References Cited

U.S. PATENT DOCUMENTS

| | | |
|---|---|---|
| 2017/0170477 A1 | 6/2017 | Sakshaug et al. |
| 2018/0090757 A1* | 3/2018 | Ikeuchi ................. H01M 4/485 |

FOREIGN PATENT DOCUMENTS

| | | | | |
|---|---|---|---|---|
| CN | 105283986 A | * | 1/2016 | ............. H01M 4/48 |
| CN | 103563132 B | | 3/2016 | |
| CN | 105283986 B | | 1/2019 | |
| CN | 109167031 A | * | 1/2019 | ............. B82Y 30/00 |
| EP | 2991141 A1 | | 3/2016 | |
| JP | 2018147772 A | * | 9/2018 | |
| WO | 2013042421 A1 | | 3/2013 | |

OTHER PUBLICATIONS

CN 109167031 English Translation (Year: 2019).*

Office Action issued on Jul. 24, 2020, in connection with corresponding Chinese Application No. 201911039028.5 (17 pp., including machine-generated English translation).

International Search Report (with English Translation) and Written Opinion (with Machine Translation) issued on Jul. 21, 2020 in corresponding International Patent Application No. PCT/CN2020/072938; 13 pages.

Extended Search Report issued on Jun. 27, 2024, in corresponding European Application No. 20883580.1, 9 pages.

Obrovac et al., "Reversible Cycling of Crystalline Silicon Powder", Journal of The Electrochemical Society, The Electrochemical Society, ISSN: 0013-4651, XP093175393, Dec. 21, 2006, vol. 154, No. 2, 6 pages.

Gonzalez et al., "Silicon Anode Design for Lithium-Ion Batteries: Progress and Perspectives", The Journal of Physical Chemistry, American Chemical Society, ACS Publications, ISSN: 1932-7447, XP093175458, Nov. 15, 2017, vol. 121, No. 50, 13 pages.

* cited by examiner

NEGATIVE ELECTRODE MATERIAL, NEGATIVE ELECTRODE CONTAINING NEGATIVE ELECTRODE MATERIAL, AND NEGATIVE ELECTRODE MANUFACTURING METHOD

CROSS-REFERENCE TO RELATED APPLICATIONS

This application is Bypass Continuation application of PCT application of PCT/CN2020/072938, filed on Jan. 19, 2020, which claims the benefit of priority of Chinese patent application 201911039028.5, filed on Oct. 29, 2019, the contents of which are incorporated herein by reference in its entirety.

TECHNICAL FIELD

This application relates to the electrochemical field, and in particular, to a negative electrode material, a negative electrode containing the negative electrode material, and a negative electrode manufacturing method.

BACKGROUND

With the rapid development of portable electronic products, communications electronic devices, and the like, the demand for secondary batteries with a high energy density is increasingly urgent. Compared with conventional graphite negative electrode materials, silicon has an extraordinarily high theoretical capacity. Therefore, in recent years, the research on silicon serving as a negative electrode material is explosively growing. Currently, as a negative electrode material, silicon improves the energy density. However, cycling stability of silicon needs to be further improved. A failure of the silicon negative electrode material mainly stems from the following facts: huge volume expansion of silicon after lithiation; and a high reactivity between a silicon surface and an electrolyte. This continuously increases a thickness of a solid electrolyte interphase (SEI) film, continuously consumes reversible lithium, and leads to capacity fading.

Therefore, it is urgent to develop a negative electrode material that has a high energy density and excellent cycling performance.

SUMMARY

This application discloses a negative electrode material, a negative electrode containing the negative electrode material, and a negative electrode manufacturing method to solve at least one problem in the related art to some extent.

According to an embodiment of this application, this application discloses a negative electrode material, including: a silicon-containing material, where a ratio B/A of a maximum value B in differentials dQ/dV with respect to 0.4V-0.55V to a maximum value A in differentials dQ/dV with respect to 0.2V-0.35V is approximately 1.0-3.0 when the negative electrode material is electrified in a delithiation direction in a case of charging and discharging a battery that includes a negative electrode made of the negative electrode material and used as a working electrode, metallic lithium used as a counter electrode, and an electrolyte containing a lithium-ion conductive substance, and in a case of plotting a curve of a relationship between a differential dQ/dV and a working electrode potential V, where the differential is obtained by differentiating a charge/discharge capacity Q with respect to the working electrode potential V.

According to an embodiment of this application, this application further discloses a negative electrode manufacturing method, including: forming a negative electrode containing a negative electrode material; and performing steps of lithiating and delithiating the negative electrode. The negative electrode material includes a silicon-containing material, and the silicon-containing material includes at least one of pure silicon, silicon carbon, a micron silicon alloy, or a silicon oxide. In the steps of lithiating and delithiating, a ratio B/A of a maximum value B in differentials dQ/dV with respect to 0.4V-0.55V to a maximum value A in differentials dQ/dV with respect to 0.2V-0.35V is approximately 1.0-3.0 when the negative electrode material is electrified in a delithiation direction in a case of charging and discharging a battery that includes the negative electrode used as a working electrode, metallic lithium used as a counter electrode, and an electrolyte containing a lithium-ion conductive substance, and in a case of plotting a curve of a relationship between a differential dQ/dV and a working electrode potential V, where the differential is obtained by differentiating a charge/discharge capacity Q with respect to the working electrode potential V.

According to an embodiment of this application, the ratio B/A of the negative electrode material is kept within approximately 1.0-3.0 by controlling a lithiation depth of the negative electrode.

According to an embodiment of this application, the silicon-containing material includes at least one of pure silicon, silicon carbon, a silicon alloy, or a silicon oxide.

According to an embodiment of this application, a ratio B/A is approximately 2.0 to 3.0 in a case that the silicon-containing material includes a silicon oxide.

According to an embodiment of this application, the silicon oxide is a silicon oxide denoted by a general formula $SiO_x$, where $0<x<2$.

According to an embodiment of this application, at least a part of an outer surface of a $SiO_x$ particle is coated with carbon.

According to an embodiment of this application, a median diameter of $SiO_x$ particles is D50 greater than 1 μm and less than 10 μm.

According to an embodiment of this application, a specific surface area of $SiO_x$ particles is less than 5 $m^2/g$.

According to an embodiment of this application, the negative electrode material further includes a fluorocarbon, where the fluorocarbon includes at least one of fluorinated graphite, fluorinated hard carbon, fluorinated soft carbon, fluorinated carbon nanotube, or fluorinated graphene.

According to an embodiment of this application, based on a total weight of the negative electrode material, a weight percent content of the fluorocarbon is less than or equal to approximately 20%.

According to an embodiment of this application, the pure silicon includes at least one of a micron particle, a nanoparticle, a nanowire, a nanofilm, or a nanosphere.

According to an embodiment of this application, this application further discloses a negative electrode containing any negative electrode material described above.

According to an embodiment of this application, this application further discloses an electrochemical apparatus, including any negative electrode described above.

According to an embodiment of this application, this application further discloses an electronic apparatus, including any electrochemical apparatus described above.

Additional aspects and advantages of the embodiments of this application will be described or illustrated in part later herein or expounded through implementation of the embodiments of this application.

DESCRIPTION OF DRAWINGS

For ease of describing the embodiments of this application, the following outlines the drawings necessary for describing the embodiments of this application or the prior art. Apparently, the drawings outlined below are only some embodiments in this application. Without making any creative efforts, a person skilled in the art can still obtain the drawings of other embodiments according to the structures illustrated in these drawings.

DETAILED DESCRIPTION

Figure 1:
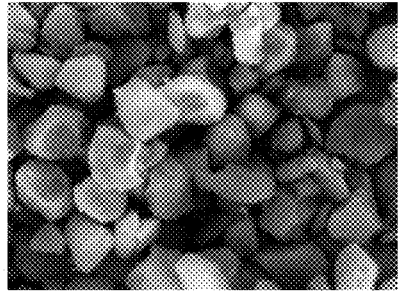
FIG. 1 is a scanning electron microscopy (SEM) diagram of negative electrode material particles including micron silicon and fluorinated graphite according to Embodiment 1.

Embodiments of this application will be described in detail below. Throughout the specification of this application, the same or similar components and the components having the same or similar functions are denoted by similar reference numerals. The embodiments described herein with reference to the accompanying drawings are illustrative and graphical in nature, and are intended to enable a basic understanding of this application. The embodiments of this application shall not be construed as a limitation on this application.

The terms "roughly," "substantially," "substantively", and "approximately" used herein are intended to describe and represent small changes. When used with reference to an event or situation, such terms may denote an example in which the event or situation occurs exactly and an example in which the event or situation occurs very similarly. For example, when used together with a numerical value, the terms may denote a variation range less than or equal to ±10% of the numerical value, such as less than or equal to ±5%, less than or equal to ±4%, less than or equal to ±3%, less than or equal to ±2%, less than or equal to ±1%, less than or equal to ±0.5%, less than or equal to ±0.1%, or less than or equal to ±0.05%. For example, if a difference between two numerical values is less than or equal to ±10% of an average of the numerical values (such as less than or equal to ±5%, less than or equal to ±4%, less than or equal to ±3%, less than or equal to ±2%, less than or equal to ±1%, less than or equal to ±0.5%, less than or equal to ±0.1%, or less than or equal to ±0.05%), the two numerical values may be considered "substantially" the same.

In addition, an amount, a ratio, or another numerical value is sometimes expressed in a range format herein. Understandably, such a range format is for convenience and brevity, and needs to be flexibly understood to include not only the numerical values explicitly specified in range limits, but also all individual numerical values or sub-ranges covered in the range as if each numerical value and each sub-range are explicitly specified.

In the description of embodiments and the claims, a list of items referred to by using the terms such as "at least one of", "at least one in", "at least one type of" or other similar terms may mean any combination of the listed items. For example, if items A and B are listed, the phrase "at least one of A or B" means: only A; only B; or, A and B. In another example, if items A, B, and C are listed, the phrase "at least one of A, B, or C" means: only A; only B; only C; A and B (excluding C); A and C (excluding B); B and C (excluding A); or, all of A, B and C. The item A may include a single component or multiple components. The item B may include a single component or multiple components. The item C may include a single component or multiple components.

In order to explore cycling performance of negative electrode materials including a silicon-containing material, in this application, a battery that includes a negative electrode material including a silicon-containing material used as a working electrode, metallic lithium used as a counter electrode, and an electrolyte containing a lithium-ion conductive substance is charged and discharged, and a curve of a relationship (V–dQ/dV) between a differential dQ/dV and a working electrode potential V is plotted, where the differential is obtained by differentiating a charge/discharge capacity Q with respect to the working electrode potential V. When the negative electrode material is electrified in a delithiation direction, a maximum value in differentials dQ/dV with respect to approximately 0.2V-0.35V is A, and a maximum value in differentials dQ/dV with respect to approximately 0.4V-0.55V is B.

Research by the inventor of this application shows that by screening silicon-containing materials whose ratio B/A is approximately 1.0-3.0, the cycling performance of the negative electrode materials including the silicon-containing materials can be significantly enhanced.

The research by the inventor of this application shows that by selectively controlling a lithiation degree of a negative electrode containing the negative electrode material, the ratio B/A is kept within approximately 1.0-3.0, and the cycling performance of the negative electrode material is greatly improved.

In addition, the research by the inventor of this application shows that by introducing a fluorocarbon into the negative electrode material including a silicon-containing material, the cycling performance of the negative electrode material can be further improved.

The invention in this application will be described in detail below, but this application is not limited to the following description.

This application discloses a negative electrode material, a negative electrode containing the negative electrode material, and a negative electrode manufacturing method. In addition, this application further discloses an electrochemical apparatus and an electronic apparatus that each contains the negative electrode material.

I. NEGATIVE ELECTRODE MATERIAL

This application discloses a negative electrode material, including a silicon-containing material. A ratio B/A of a maximum value B in differentials dQ/dV with respect to approximately 0.4V-0.55V to a maximum value A in differentials dQ/dV with respect to approximately 0.2V-0.35V is approximately 1.0-3.0 when the negative electrode material is electrified in a delithiation direction in a case of charging and discharging, between OV and 2V, a battery that includes a negative electrode material used as a working electrode, metallic lithium used as a counter electrode, and an electrolyte containing a lithium-ion conductive substance, and in a case of plotting a V-dQ/dV curve.

In some embodiments, the ratio B/A may be approximately 1.0 to 1.8, approximately 1.4 to 1.7, or approximately 2.0 to 2.5, for example, may be roughly 1.0, 1.2, 1.4, 1.6, 1.8, 2.0, 2.1, 2.2, 2.3, 2.4, 2.5, 2.6, 2.7, 2.8, 2.9, or 3.0, or may be a range defined by any two of such ratios.

In some embodiments, the silicon-containing material includes at least one of pure silicon, silicon carbon, a silicon alloy, or a silicon oxide. In some embodiments, the silicon oxide is a silicon oxide denoted by a general formula $SiO_x$, where $0<x<2$. In some embodiments, the negative electrode material includes $SiO_x$ particles, and a median diameter of the $SiO_x$ particles is D50 greater than 1 μm and less than 10 μm. For example, in some embodiments, the median diameter D50 of the $SiO_x$ particles may be approximately 2 μm, approximately 3 μm, approximately 4 μm, approximately 5 μm, approximately 6 μm, approximately 7 μm, approximately 8 μm, approximately 9 μm, or approximately 10 μm, or a range defined by any two of such values. In some embodiments, at least a part of an outer surface of a $SiO_x$ particle may be coated with carbon. In some embodiments, a specific surface area of the $SiO_x$ particles is less than approximately 5 $m^2/g$. For example, in some embodiments, the specific surface area of the $SiO_x$ particles is less than approximately 4 $m^2/g$ or approximately 2 $m^2/g$ or the like.

In some embodiments, the silicon-containing material includes pure silicon, and the pure silicon may be at least one of a micron particle, an irregular nanoparticle, a nanowire, a nanofilm, or a nanosphere.

In some embodiments, the silicon-containing material includes a silicon alloy, and the silicon alloy includes at least one of a ferrosilicon alloy, a silicon-aluminum alloy, a silicon-nickel alloy, or a ferro silicon aluminum alloy.

In some embodiments, the negative electrode material may further include a fluorocarbon, where the fluorocarbon includes at least one of fluorinated graphite, fluorinated hard carbon, fluorinated soft carbon, fluorinated carbon nanotube, or fluorinated graphene. In some embodiments, the fluorocarbon may be on a surface of the silicon-containing material. During a first-charge or lithiation process of the negative electrode containing the negative electrode material, the fluorocarbon reacts in situ around or on the surface of particles of the silicon-containing material to form a graphene-like sheet layer and a lithium fluoride coating layer. The graphene-like sheet layer increases conductivity of the negative electrode, and the lithium fluoride coating layer may be used as an solid electrolyte interphase (SEI) film and may serve a protective function for a surface of a silicon-containing negative electrode active substance particle, thereby further improving the cycling performance of the negative electrode material.

In some embodiments, based on a total weight of the negative electrode material, a weight percent content of the fluorocarbon is less than or equal to approximately 20%. In some embodiments, based on the total weight of the negative electrode material, the weight percent content of the fluorocarbon is less than or equal to approximately 5%, less than or equal to approximately 10%, less than or equal to approximately 15%, approximately 5% to approximately 10%, approximately 5% to approximately 15%, approximately 10% to approximately 20%, or the like.

II. NEGATIVE ELECTRODE AND NEGATIVE ELECTRODE MANUFACTURING METHOD

This application discloses a negative electrode, and the negative electrode contains any negative electrode material described above.

In some embodiments, the negative electrode may further include a bonding agent in addition to a negative electrode material, the bonding agent improves bonding between negative electrode material particles and bonding between the negative electrode material and a current collector. In some embodiments, the bonding agent includes, but is not limited to: polyvinyl alcohol, carboxymethyl cellulose, hydroxypropyl cellulose, diacetyl cellulose, polyvinyl chloride, carboxylated polyvinyl chloride, polyvinyl fluoride, a polymer containing ethylene oxide, polyvinylpyrrolidone, polyurethane, polytetrafluoroethylene, poly (1,1-difluoroethylene), polyethylene, polypropylene, styrene-butadiene rubber, acrylic styrene-butadiene rubber, epoxy resin, and nylon.

In some embodiments, the negative electrode may further include a conductive agent in addition to a negative electrode material and a bonding agent. The conductive agent includes, but is not limited to, a carbon-based material, a metal-based material, a conductive polymer, or a mixture thereof. In some embodiments, the carbon-based material is selected from natural graphite, artificial graphite, carbon black, acetylene black, Ketjen black, carbon fiber, or any combination thereof. In some embodiments, the metal-based material is selected from metal powder, metal fiber, copper, nickel, aluminum, and silver. In some embodiments, the conductive polymer is a polyphenylene derivative. This application further discloses a negative electrode manufacturing method, including: forming a negative electrode containing a negative electrode material; and performing steps of lithiating and delithiating the negative electrode. The negative electrode material includes a silicon-containing material, and the silicon-containing material includes at least one of pure silicon, silicon carbon, a silicon alloy, or a silicon oxide. In the steps of lithiating and delithiating, a ratio B/A of a maximum value B in differentials dQ/dV with respect to 0.4V-0.55V to a maximum value A in differentials dQ/dV with respect to 0.2V-0.35V is 1.0-3.0 when the negative electrode material is electrified in a delithiation direction in a case of charging and discharging a battery that includes the negative electrode used as a working electrode, metallic lithium used as a counter electrode, and an electrolyte containing a lithium-ion conductive substance, and in a case of plotting a V-dQ/dV curve.

In some embodiments, silicon-containing negative electrode materials may be screened so that the ratio B/A is approximately 1.0-3.0. The screened negative electrode material with the ratio B/A of approximately 1.0-3.0 is used to manufacture the negative electrode so that the negative electrode has good cycling performance.

In some embodiments, the ratio B/A may be kept within approximately 1.0-3.0 by controlling a lithiation depth of the negative electrode. By selectively controlling the lithiation depth of the negative electrode, the ratio B/A is still kept within approximately 1.0-3.0 without screening the silicon-containing negative electrode materials, so that the negative electrode has good cycling performance.

In some embodiments, the ratio B/A may be kept within approximately 1.0-3.0 by both screening the silicon-containing negative electrode materials and controlling the lithiation depth of the negative electrode.

In some embodiments, the step of forming a negative electrode containing a negative electrode material includes: mixing a silicon-containing material and a fluorocarbon to form a negative electrode material, mixing the negative electrode material, a conductive agent, and a bonding agent at a specific ratio to obtain a negative electrode slurry, and then applying the negative electrode slurry to a negative electrode current collector (such as a copper current collector), and performing baking and calendering to obtain a negative electrode.

In some embodiments, the controlling the lithiation depth of the negative electrode includes: determining a lithiation capacity Q1 in a 100% state of charge (SOC), selecting an appropriate charging process, and controlling a first-charge capacity to x % Q1 to achieve an x % SOC lithiation depth.

III. ELECTROCHEMICAL APPARATUS

An embodiment of this application further discloses an electrochemical apparatus including a negative electrode material in this application. The electrochemical apparatus may be any apparatus in which an electrochemical reaction occurs. Specific examples of the apparatus include all kinds of primary batteries, secondary batteries, fuel cells, solar cells, or capacitors. In particular, the electrochemical apparatus is a lithium secondary battery, including a lithium metal secondary battery, a lithium-ion secondary battery, a lithium polymer secondary battery, or a lithium-ion polymer secondary battery. The electrochemical apparatus includes a positive electrode, the negative electrode, and a separator disposed between the positive electrode and the negative electrode.

In some embodiments, the electrochemical apparatus is a lithium-ion battery. The lithium-ion battery includes a positive electrode containing a positive electrode material, a negative electrode containing a negative electrode material, an electrolyte, and a separator located between the positive electrode and the negative electrode. The negative electrode material is the negative electrode material described above. A positive electrode current collector may be an aluminum foil or a nickel foil, and a negative electrode current collector may be a copper foil or a nickel foil.

In some embodiments, the positive electrode material may include lithium cobaltate ($LiCoO_2$), a lithium nickel cobalt manganese (NCM) ternary material, lithium ferrous phosphate ($LiFePO_4$), lithium manganate ($LiMn_2O_4$), or any combination thereof.

In some embodiments, the electrochemical apparatus in this application has a separator disposed between the positive electrode and the negative electrode to prevent short circuit. The material and the shape of the separator used in the electrochemical apparatus in this application are not particularly limited, and may be based on any technologies disclosed in the prior art. In some embodiments, the separator includes a polymer or an inorganic substance or the like formed of a material that is stable to the electrolyte.

IV. ELECTRONIC APPARATUS

The electrochemical apparatus manufactured from the negative electrode material described in this application is applicable to electronic apparatuses in various fields.

The use of the electrochemical apparatus in this application is not particularly limited, and the electrochemical apparatus may be used for any purpose known in the art. In an embodiment, the electrochemical apparatus in this application is applicable to, but without limitation, a notebook computer, a pen-inputting computer, a mobile computer, an e-book player, a portable phone, a portable fax machine, a portable photocopier, a portable printer, a stereo headset, a video recorder, a liquid crystal display television set, a handheld cleaner, a portable CD player, a mini CD-ROM, a transceiver, an electronic notepad, a calculator, a memory card, a portable voice recorder, a radio, a backup power supply, a motor, a car, a motorcycle, a power-assisted bicycle, a bicycle, a lighting appliance, a toy, a game machine, a watch, an electric tool, a flashlight, a camera, a large household battery, a lithium-ion capacitor, and the like.

V. EMBODIMENTS

The following describes this application in further detail with reference to embodiments and comparative embodiments. However, to the extent not departing from the essence of this application, this application is not limited to such embodiments.

Embodiment 1

10 grams of micron silicon (whose D50 is approximately 4 µm) and 0.5 gram of fluorinated graphite (that is, a weight percent content of the fluorinated graphite is 4.8%) are ball-mill mixed to form a negative electrode material (FIG. 1 is a SEM diagram of a negative electrode active substance according to Embodiment 1). The negative electrode material, a conductive agent, and a bonding agent are mixed at a ratio of 8:1:1 representing negative electrode material:conductive agent:bonding agent to obtain a negative electrode slurry, and then the obtained negative electrode slurry is applied to a copper current collector. The copper current collector is baked and calendered to obtain a negative electrode. The manufactured negative electrode is combined with metal lithium serving as a counter electrode, so as to assemble a coin half-cell. The assembled coin half-cell is charged and discharged, and a lithiation depth of the negative electrode is controlled to 25% SOC. A V-dQ/dV curve is plotted. The negative electrode is electrified at a 0.05C rate in a delithiation direction. A ratio B/A of a maximum value B in differentials dQ/dV with respect to 0.4V-0.55V to a maximum value A in differentials dQ/dV with respect to 0.2V-0.35V is 2.14.

Discharging is performed with a 0.05C rate constant current until 5 mV, and then discharging is performed with a 50 µA current instead until 5 mV, and then discharging is performed with a 10 µA current until 5 mV. The discharge capacity at this time serves as a lithiation capacity Q for 100% SOC. The lithiation depth may be controlled in multiple ways. For example, the lithiation depth may be controlled to 25% SOC by a first-charge capacity of 25% Q achieved by lithiating with a 0.05C rate constant current for 5 hours.

Embodiment 2

The manufacturing method in Embodiment 2 is the same as that in Embodiment 1 except that in Embodiment 2, the lithiation depth of the negative electrode is controlled to 35% SOC and the ratio B/A is 1.06.

Embodiment 3

The manufacturing method in Embodiment 3 is the same as that in Embodiment 1 except that in Embodiment 3, the lithiation depth of the negative electrode is controlled to 40% SOC and the ratio B/A is 1.74.

Embodiment 4

The manufacturing method in Embodiment 4 is the same as that in Embodiment 1 except that in Embodiment 4, the lithiation depth of the negative electrode is controlled to 43% SOC and the ratio B/A is 1.4.

Embodiment 5

The manufacturing method in Embodiment 5 is the same as that in Embodiment 1 except that in Embodiment 5, the lithiation depth of the negative electrode is controlled to 48% SOC and the ratio B/A is 2.3.

Embodiment 6

The manufacturing method in Embodiment 6 is the same as that in Embodiment 1 except that in Embodiment 6, the lithiation depth of the negative electrode is controlled to 50% SOC and the ratio B/A is 1.

Embodiment 7

The manufacturing method in Embodiment 7 is the same as that in Embodiment 1 except that in Embodiment 7, the lithiation depth of the negative electrode is controlled to 55% SOC and the ratio B/A is 2.8.

Embodiment 8

The manufacturing method in Embodiment 8 is the same as that in Embodiment 1 except that in Embodiment 8, the negative electrode contains no fluorinated graphite, the lithiation depth of the negative electrode is controlled to 55% SOC, and the ratio B/A is 2.7.

Embodiment 9

The manufacturing method in Embodiment 9 is the same as that in Embodiment 1 except that in Embodiment 9, the negative electrode contains no fluorinated graphite, the lithiation depth of the negative electrode is controlled to 48% SOC, and the ratio B/A is 2.2.

Embodiment 10

The manufacturing method in Embodiment 10 is the same as that in Embodiment 1 except that in Embodiment 10, the negative electrode contains no fluorinated graphite, the lithiation depth of the negative electrode is controlled to 25% SOC, and the ratio B/A is 2.0.

Embodiment 11

10 grams of $SiO_x$ (where $0<x<2$, D50 is 6 μm, and a specific surface area is 2 m²/g) and 0.5 gram of fluorinated graphite (that is, a weight percent content of the fluorinated graphite is 4.8%) are ball-mill mixed to form a negative electrode material. The negative electrode material, a conductive agent, and a bonding agent are mixed at a ratio of 8:1:1 representing negative electrode material:conductive agent:bonding agent to obtain a negative electrode slurry, and then the obtained negative electrode slurry is applied to a copper current collector. The copper current collector is baked and calendered to obtain a negative electrode. The manufactured negative electrode is combined with metal lithium serving as a counter electrode, so as to assemble a coin half-cell. The assembled coin half-cell is charged and discharged, and a lithiation depth of the negative electrode is controlled to 50% SOC. A V-dQ/dV curve is plotted. The negative electrode is electrified at a 0.05C rate in a delithiation direction. A ratio B/A of a maximum value B in differentials dQ/dV with respect to 0.4V-0.55V to a maximum value A in differentials dQ/dV with respect to 0.2V-0.35V is 2.

Embodiment 12

The manufacturing method in Embodiment 12 is the same as that in Embodiment 11 except that in Embodiment 12, the lithiation depth of the negative electrode is controlled to 65% SOC and the ratio B/A is 1.29.

Comparative Embodiment 1

The manufacturing method in Comparative Embodiment 1 is the same as that in Embodiment 1 except that in Comparative Embodiment 1, the lithiation depth of the negative electrode is controlled to 73% SOC and the ratio B/A is 0.84.

Comparative Embodiment 2

The manufacturing method in Comparative Embodiment 2 is the same as that in Embodiment 1 except that in Comparative Embodiment 2, the lithiation depth of the negative electrode is controlled to 100% SOC and the ratio B/A is 24.

Comparative Embodiment 3

The manufacturing method in Comparative Embodiment 3 is the same as that in Embodiment 1 except that in Comparative Embodiment 3, the lithiation depth of the negative electrode is controlled to 10% SOC and the ratio B/A is 0.4.

Comparative Embodiment 4

10 grams of micron silicon (whose D50 is approximately 4 μm) are used as a negative electrode material. The negative electrode material, a conductive agent, and a bonding agent are mixed at a ratio of 8:1:1 representing negative electrode material:conductive agent:bonding agent to obtain a negative electrode slurry, and then the obtained negative electrode slurry is applied to a copper current collector. The copper current collector is baked and calendered to obtain a negative electrode. The manufactured negative electrode is combined with metal lithium serving as a counter electrode, so as to assemble a coin half-cell. The assembled coin half-cell is discharged with a 0.05C rate constant current until 5 mV, and then discharged with a 50 μA current instead until 5 mV, and then discharged with a 10 μA current until 5 mV. The discharge capacity at this time is 90% of the capacity existent after the same discharging process is completed in Comparative Embodiment 2 (in which the negative electrode contains fluorinated graphite), denoted by 90% SOC. A V-dQ/dV curve is plotted. The negative electrode is electrified at a 0.05C rate in a delithiation direction. A ratio B/A of a maximum value B in differentials dQ/dV with respect to 0.4V-0.55V to a maximum value A in differentials dQ/dV with respect to 0.2V-0.35V is 10.

Comparative Embodiment 5

The manufacturing method in Comparative Embodiment 5 is the same as that in Embodiment 11 except that in Comparative Embodiment 5, the lithiation depth of the negative electrode is controlled to 85% SOC and the ratio B/A is 0.60.

Comparative Embodiment 6

The manufacturing method in Comparative Embodiment 6 is the same as that in Embodiment 11 except that in Comparative Embodiment 6, the lithiation depth of the negative electrode is controlled to 98% SOC and the ratio B/A is 0.56.

Battery Test Method and Results

Discharging is performed in Embodiments 1 to 12 and Comparative Embodiments 1 to 6 in which a lithium depth is given, so as to obtain a corresponding voltage V1, then discharging is performed with a 0.05C rate constant current until a corresponding voltage V1, and then discharging is performed with a 50 µA current instead until the voltage V1. Finally, the discharging is performed with a 10 µA current until the voltage V1, and the discharging is completed. Charging is performed with a 0.05C rate constant current until 1.2V, so that one charge-discharge cycle is completed. 20 charge-discharge cycles are performed in the foregoing way to test the cycling performance of the lithium-ion battery. Table 1 shows test results in Embodiments 1 to 10 and Comparative Embodiments 1 to 4. Table 2 shows test results in Embodiments 11 and 12 and Comparative Embodiments 5 and 6.

TABLE 1

| Sample | B/A | Content of fluorinated graphite | Lithiation depth SOC | Delithiation capacity (mAh/g) | Capacity retention rate after 20 cycles |
|---|---|---|---|---|---|
| Embodiment 1 | 2.14 | 4.8% | 25% | 837 | 96.0% |
| Embodiment 2 | 1.06 | 4.8% | 35% | 1204 | 101.0% |
| Embodiment 3 | 1.74 | 4.8% | 40% | 1399 | 107.2% |
| Embodiment 4 | 1.4 | 4.8% | 43% | 1506 | 102.0% |
| Embodiment 5 | 2.3 | 4.8% | 48% | 1658 | 90.0% |
| Embodiment 6 | 1 | 4.8% | 50% | 1768 | 89.0% |
| Embodiment 7 | 2.8 | 4.8% | 55% | 1830 | 86.0% |
| Embodiment 8 | 2.7 | 0% | 55% | 1805 | 80.0% |
| Embodiment 9 | 2.2 | 0% | 48% | 1637 | 86.0% |
| Embodiment 10 | 2.0 | 0% | 25% | 806 | 91.0% |
| Comparative Embodiment 1 | 0.84 | 4.8% | 73% | 2535 | 55.6% |
| Comparative | 24 | 4.8% | 100% | 3478 | 46.0% |

TABLE 1-continued

| Sample | B/A | Content of fluorinated graphite | Lithiation depth SOC | Delithiation capacity (mAh/g) | Capacity retention rate after 20 cycles |
|---|---|---|---|---|---|
| Embodiment 2 | | | | | |
| Comparative Embodiment 3 | 0.4 | 4.8% | 10% | 319 | 76.0% |
| Comparative Embodiment 4 | 10 | 0% | 90% | 3186 | 39.0% |

TABLE 2

| Sample | B/A | Content of fluorinated graphite | Lithiation depth SOC | Delithiation capacity (mAh/g) | Capacity retention rate after 30 cycles |
|---|---|---|---|---|---|
| Embodiment 11 | 2 | 4.8% | 50% | 541 | 150% |
| Embodiment 12 | 1.29 | 4.8% | 65% | 934 | 110% |
| Comparative Embodiment 5 | 0.6 | 4.8% | 85% | 1340 | 100% |
| Comparative Embodiment 6 | 0.56 | 4.8% | 98% | 1547 | 92.8% |

As can be learned from the test results in Table 1, when the negative electrode material includes micron silicon and fluorinated graphite, the battery cycling performance can be considerably improved by controlling the lithiation depth of the negative electrode and keeping the ratio B/A within 1.0-3.0.

Figure 2:
FIG. 2 is a scanning electron microscopy-energy dispersive spectroscopy (SEM-EDS) diagram of fluorine element in the negative electrode material according to Embodiment 1.
Figure 3:
FIG. 3 is a SEM-EDS diagram of carbon element in the negative electrode material according to Embodiment 1.
Figure 4:
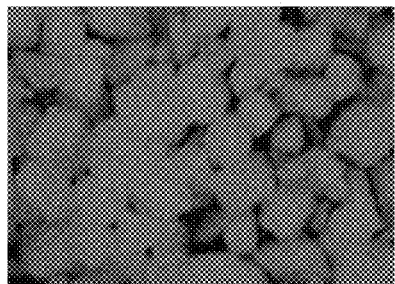
FIG. 4 is a SEM-EDS diagram of silicon element in the negative electrode material according to Embodiment 1.

FIG. 1 is a scanning electron microscopy (SEM) diagram of negative electrode material particles including micron silicon and fluorinated graphite according to Embodiment 1. FIG. 2, FIG. 3, and FIG. 4 are SEM-EDS diagrams of fluorine element, carbon element, and silicon element of the negative electrode material according to Embodiment 1 respectively. FIG. 2 to FIG. 4 illustrate that the surface of micron silicon is evenly coated with a layer of fluorinated graphite material.

Figure 5:
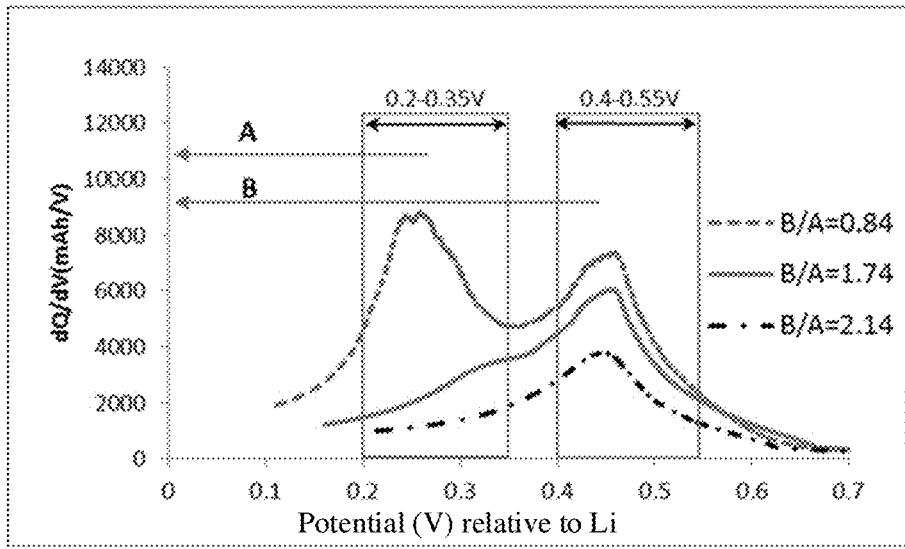
FIG. 5 is a V-dQ/dV curve in a case of delithiating a negative electrode according to Embodiment 1, Embodiment 3, and Comparative Embodiment 1.
Figure 6:
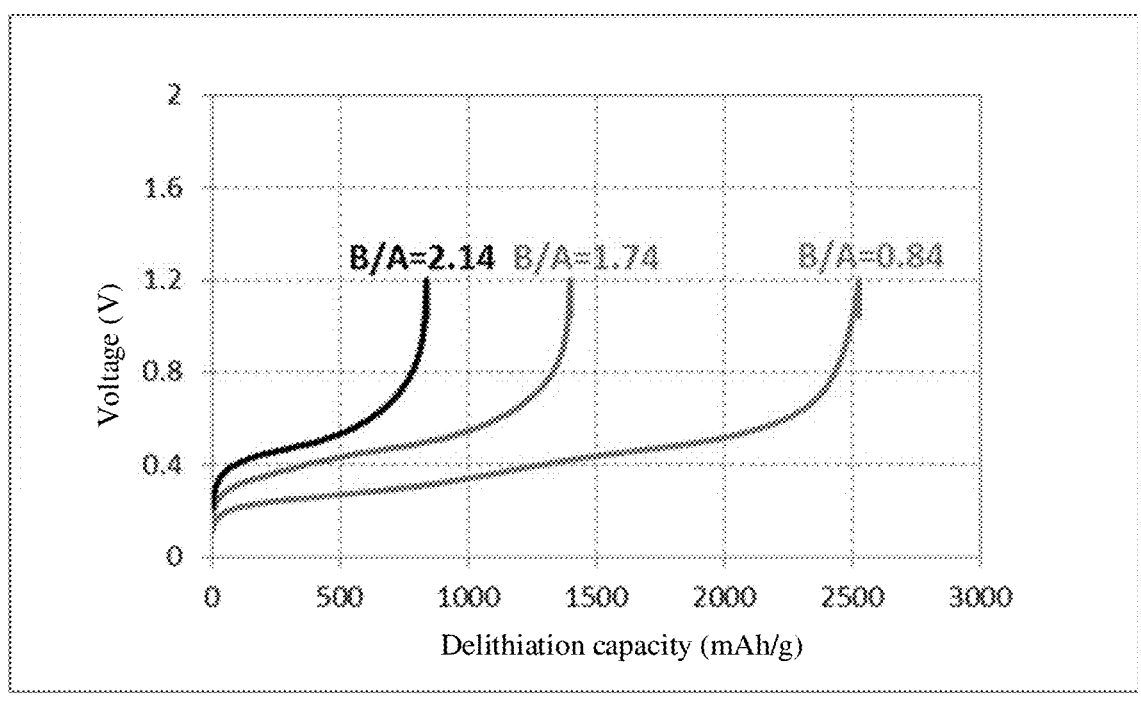
FIG. 6 is a delithiation curve according to Embodiment 1, Embodiment 3, and Comparative Embodiment 1.
Figure 7:
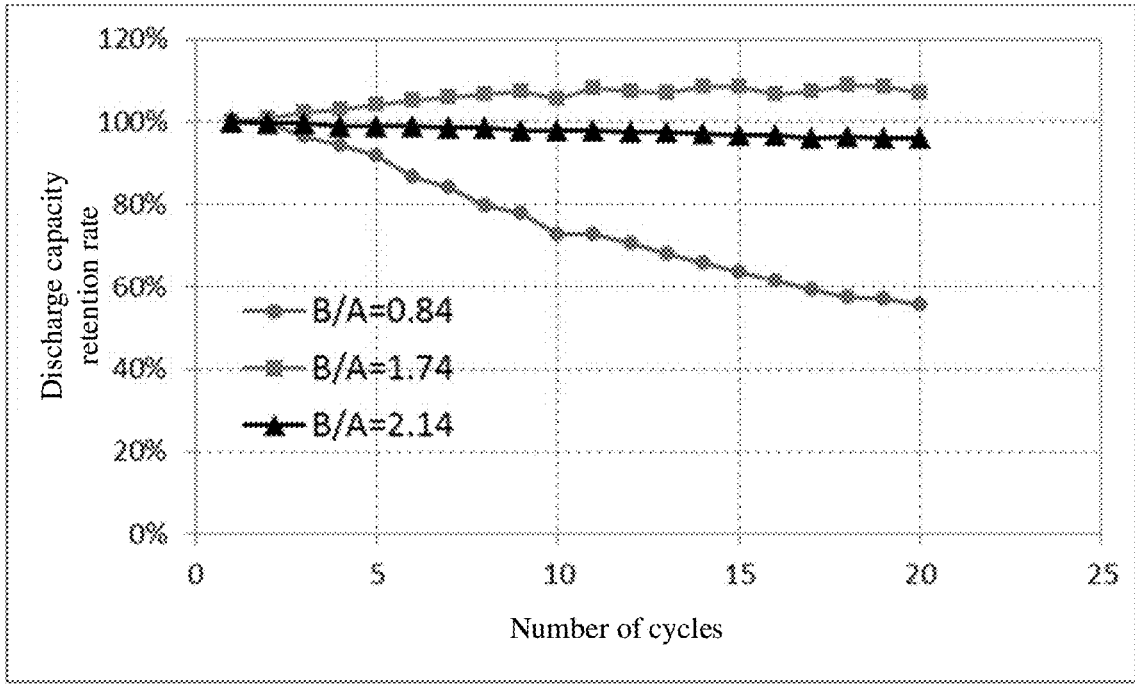
FIG. 7 is a cycling performance curve according to Embodiment 1, Embodiment 3, and Comparative Embodiment 1.

FIG. 5 shows V-dQ/dV curves in a case of delithiating the negative electrode according to Embodiments 1 and 3 and Comparative Embodiment 1, where A represents the strongest peak between 0.2V and 0.35V and B represents the strongest peak between 0.4V and 0.55V. FIG. 6 shows delithiation curves obtained by discharging the negative electrode under a given lithiation depth according to Embodiments 1 and 3 and Comparative Embodiment 1. FIG. 6 illustrates that different B/A values have different delithiation capacities, depending on the controlled lithiation capacity. FIG. 7 is a curve of cycling performance after a test of 20 charge-discharge cycles according to Embodiments 1 and 3 and Comparative Embodiment 1. As shown in FIG. 7, Comparative Embodiment 1, Embodiment 3 and Comparative Embodiment 1 show that when the ratio B/A is in the range of 1.0-3.0, the discharge capacity retention rate after 20 cycles of the battery can still remain above 95%. The battery cycling performance in Embodiments 1 and 3 is significantly better than that in Comparative Embodiment 1. This application significantly improves the battery cycling performance by controlling B/A to 1.0-3.0.

The test results in Table 2 indicate that silicon oxide (for example, $SiO_x$ particles) can also achieve similar effects as micron silicon. That is, when the negative electrode material includes a silicon oxide and a fluorocarbon, the battery cycling performance can be considerably improved by controlling the lithiation depth of the negative electrode and keeping the ratio B/A within 1.0-3.0.

References to "embodiments", "some embodiments", "an embodiment", "another example", "example", "specific example" or "some examples" throughout the specification mean that at least one embodiment or example in this application includes specific features, structures, materials, or characteristics described in the embodiment(s) or example(s). Therefore, descriptions throughout the specification, which make references by using expressions such as "in some embodiments", "in an embodiment", "in one embodiment", "in another example", "in an example", "in a specific example", or "example", do not necessarily refer to the same embodiment or example in this application. In addition, specific features, structures, materials, or characteristics herein may be combined in one or more embodiments or examples in any appropriate manner.

Although illustrative embodiments have been demonstrated and described above, a person skilled in the art understands that the above embodiments shall not be construed as a limitation on this application, and changes, replacements, and modifications may be made to the embodiments without departing from the spirit, principles, and scope of this application.

What is claimed is:

1. An electrochemical apparatus, comprising a negative electrode, the negative electrode comprises a negative electrode material, wherein the negative electrode material comprises a silicon-containing material and a fluorocarbon coated on the surface of the silicon-containing material; the fluorocarbon is at least one of fluorinated graphite, fluorinated hard carbon, fluorinated soft carbon, fluorinated carbon nanotube, or fluorinated graphene;

wherein based on a total weight of the negative electrode material, a weight percent content of the fluorocarbon is greater than 15% and less than or equal to 20%;

wherein the negative electrode material has a ratio B/A ranging from 2.5 to 3.0, wherein the ratio B/A is a ratio of a maximum value B of differentials dQ/dV within a working electrode potential range of 0.4V-0.55V to a maximum value A of differentials dQ/dV within a working electrode potential range of 0.2V-0.35V, as determined by measuring a battery comprising a negative electrode made of the negative electrode material as a working electrode, metallic lithium as a counter electrode, and an electrolyte containing a lithium-ion conductive substance, during delithiation of the negative electrode material, based on a curve of differential dQ/dV plotted against working electrode potential V, wherein the differential dQ/dV is obtained by differentiating a charge/discharge capacity Q with respect to the working electrode potential V.

2. The electrochemical apparatus according to claim 1, wherein the silicon-containing material comprises at least one of pure silicon, silicon carbon, a silicon alloy, or a silicon oxide.

3. The electrochemical apparatus according to claim 2, wherein the silicon oxide is a silicon oxide denoted by a general formula $SiO_x$, wherein $0<x<2$.

4. The electrochemical apparatus according to claim 3, wherein at least a part of an outer surface of a $SiO_x$ particle is coated with carbon.

5. The electrochemical apparatus according to claim 3, wherein a median diameter of $SiO_x$ particles D50 is greater than 1 μm and less than 10 μm.

6. The electrochemical apparatus according to claim 3, wherein a specific surface area of $SiO_x$ particles is less than 5 $m^2/g$.

7. The electrochemical apparatus according to claim 2, wherein the silicon-containing material comprises pure silicon; and the pure silicon comprises at least one of a micron particle, a nanoparticle, a nanowire, a nanofilm, or a nanosphere.

8. The electrochemical apparatus according to claim 1, wherein the fluorocarbon comprises fluorinated carbon nanotube.

9. An electronic apparatus, comprising the electrochemical apparatus according to claim 1.

10. A negative electrode, comprising: a negative electrode material, the negative electrode material comprises a silicon-containing material and a fluorocarbon coated on a surface of the silicon-containing material, the fluorocarbon is at least one of fluorinated graphite, fluorinated hard carbon, fluorinated soft carbon, fluorinated carbon nanotube, or fluorinated graphene;

wherein based on a total weight of the negative electrode material, a weight percent content of the fluorocarbon is greater than 15% and less than or equal to 20%;

wherein the negative electrode material has a ratio B/A ranging from 2.5 to 3.0, wherein the ratio B/A is a ratio of a maximum value B of differentials dQ/dV within a working electrode potential range of 0.4V-0.55V to a maximum value A of differentials dQ/dV within a working electrode potential range of 0.2V-0.35V, as determined by measuring a battery comprising a negative electrode made of the negative electrode material as a working electrode, metallic lithium as a counter electrode, and an electrolyte containing a lithium-ion conductive substance, during delithiation of the negative electrode material, based on a curve of differential dQ/dV plotted against working electrode potential V, wherein the differential dQ/dV is obtained by differentiating a charge/discharge capacity Q with respect to the working electrode potential V.

11. A method of manufacturing a negative electrode, comprising:

forming a negative electrode containing a negative electrode material; and performing steps of lithiating and delithiating the negative electrode, wherein the negative electrode material comprises a silicon-containing material and a fluorocarbon coated on a surface of the silicon-containing material, and the silicon-containing material comprises at least one of pure silicon, silicon carbon, a silicon alloy, or a silicon oxide; wherein the fluorocarbon is at least one of fluorinated graphite, fluorinated hard carbon, fluorinated soft carbon, fluorinated carbon nanotube, or fluorinated graphene;

wherein based on a total weight of the negative electrode material, a weight percent content of the fluorocarbon is greater than 15% and less than or equal to 20%; and in the steps of lithiating and delithiating, a ratio B/A of a maximum value B in differentials dQ/dV with respect to 0.4V-0.55V to a maximum value A in differentials dQ/dV with respect to 0.2V-0.35V is 2.5-3.0 when the negative electrode material is electrified in a delithiation direction in a case of charging and discharging a battery that comprises the negative electrode used as a working electrode, metallic lithium used as a counter electrode, and an electrolyte containing a lithium-ion conductive substance, and in a case of plotting a curve of a relationship between a differential dQ/dV and a working electrode potential V, wherein the differential dQ/dV is obtained by differentiating a charge/discharge capacity Q with respect to the working electrode potential V.

12. The manufacturing method according to claim 11, wherein the ratio B/A of the negative electrode material is kept within 2.5-3.0 by controlling a lithiation depth of the negative electrode.

\* \* \* \* \*